US012623542B2

(12) United States Patent
Kim

(10) Patent No.: US 12,623,542 B2
(45) Date of Patent: May 12, 2026

(54) APPARATUS AND METHOD FOR RECOGNIZING TRAFFIC SIGNS

(71) Applicant: HYUNDAI MOBIS CO., LTD., Seoul (KR)

(72) Inventor: Wan Jin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 89 days.

(21) Appl. No.: 18/661,072

(22) Filed: May 10, 2024

(65) Prior Publication Data

US 2025/0018795 A1     Jan. 16, 2025

(30) Foreign Application Priority Data

Jul. 11, 2023     (KR) ........................ 10-2023-0089994

(51) Int. Cl.
*B60K 35/80*          (2024.01)
*B60K 35/28*          (2024.01)
*B60W 50/14*          (2020.01)
*G06V 20/58*          (2022.01)

(52) U.S. Cl.
CPC .............. *B60K 35/80* (2024.01); *B60K 35/28* (2024.01); *B60W 50/14* (2013.01); *G06V 20/582* (2022.01); *B60K 2360/195* (2024.01); *B60W 2050/146* (2013.01); *B60W 2420/403* (2013.01); *B60W 2555/60* (2020.02)

(58) Field of Classification Search
CPC .. B60K 35/80; B60K 35/28; B60K 2360/195; G06V 20/582; B60W 50/14; B60W 2555/60; B60W 2050/146; B60W 2420/403; G08G 1/00; G09G 5/00; G06F 3/00; B60Q 9/00; G01S 13/88; G01S 13/931

USPC ............................................................ 701/36
See application file for complete search history.

(56) References Cited

U.S. PATENT DOCUMENTS

| | | | | |
|---|---|---|---|---|
| 10,300,853 B2 * | 5/2019 | Yokochi | .................. | B60R 11/04 |
| 11,423,668 B2 * | 8/2022 | Ro | ........................ | G05D 1/0094 |
| 2016/0137127 A1 * | 5/2016 | Yokochi | ............... | G06V 20/588 |
| | | | | 348/148 |
| 2017/0217435 A1 * | 8/2017 | Custer | .................. | G06V 20/582 |

(Continued)

FOREIGN PATENT DOCUMENTS

| | | | | | | |
|---|---|---|---|---|---|---|
| GB | | 2508393 | A | * | 6/2014 | ....... G08G 1/096783 |
| GB | | 2599082 | A | * | 3/2022 | ............ B60W 60/00 |
| WO | WO-2022053713 | A1 | * | 3/2022 | ............ B60W 60/00 |

*Primary Examiner* — Tuan C To
(74) *Attorney, Agent, or Firm* — NSIP Law

(57) ABSTRACT

A traffic sign recognizing apparatus and method therefor are provided. The apparatus includes: a camera sensor to capture an image in front of a vehicle; a recognition device to: recognize a speed limit sign from the captured image; and obtain from the captured image, traffic sign information including at least one of speed limit information, conditional information, or a combination thereof; a display device; and a control device to: determine output information by combining the speed limit information and the conditional information included in each of one or more pieces of the traffic sign information when the one or more pieces of the traffic sign information related to the speed limit sign are obtained by the recognition device, and the one or more pieces of the traffic sign information satisfy a predetermined condition; and control the display device to display the output information.

12 Claims, 11 Drawing Sheets

(56) References Cited

U.S. PATENT DOCUMENTS

| | | | |
|---|---|---|---|
| 2018/0244277 A1* | 8/2018 | Yoshitomi | B60K 35/22 |
| 2019/0325349 A1* | 10/2019 | Zhang | G06N 3/0464 |
| 2022/0172491 A1* | 6/2022 | Tanikawa | G06V 10/82 |
| 2024/0005670 A1* | 1/2024 | Ro | B60W 40/02 |
| 2024/0355129 A1* | 10/2024 | Jo | G06V 20/588 |

* cited by examiner

APPARATUS AND METHOD FOR RECOGNIZING TRAFFIC SIGNS

CROSS-REFERENCE TO RELATED APPLICATION

This application claims the benefit of priority, under 35 USC § 119, to Korean Patent Application No. 10-2023-0089994, filed in the Korean Intellectual Property Office on Jul. 11, 2023, the entire contents of which are incorporated herein by reference for all purposes.

BACKGROUND

1. Field

The present disclosure relates to a traffic sign recognizing apparatus and a method thereof, and more specifically, relates to a traffic sign recognizing apparatus that may prevent erroneous output of speed limit information caused by omitting a conditional traffic sign from a speed limit sign including a traffic sign (e.g., a conditional traffic sign).

2. Description of the Related Art

A traffic sign recognition (TSR) system refers to a system that prevents traffic accidents caused by speeding, by recognizing general and electronic traffic signs through a front camera while a vehicle is driving, displaying relevant information on a cluster, and providing speed limit information of a road, on which the vehicle is driving, and a warning. In particular, there is a need for a function of recognizing and displaying not only a main traffic sign but also an additional auxiliary traffic sign. Generally, unlike the main traffic sign, conditional traffic sign information provided by the auxiliary traffic sign is not speed limit information that directly affects current driving, but is speed information that needs to be referenced depending on situations when a condition of the corresponding traffic sign is satisfied.

A technology for recognizing a traffic sign according to a conventional embodiment recognizes a traffic sign by using a camera and outputs and provides a driver with speed limit information at a point in time when a camera passes by.

However, when failing to recognize a main traffic sign and a conditional traffic sign as one speed limit sign, the conventional technology may incorrectly recognize the one speed limit sign as a plurality of speed limit signs. In addition, when recognizing the one speed limit sign as a plurality of speed limit signs, the conventional technology may incorrectly recognize the one speed limit sign with the conditional traffic sign omitted. Accordingly, when recognizing a traffic sign without the conditional traffic sign, the speed limit may be output incorrectly.

SUMMARY

The present disclosure has been made to solve the above-mentioned problems occurring in the prior art while advantages achieved by the prior art are maintained intact.

An aspect of the present disclosure provides a traffic sign recognizing apparatus that may prevent erroneous output of speed limit information caused by omitting a conditional traffic sign from a speed limit sign including a traffic sign (e.g., a conditional traffic sign), and a method thereof.

An aspect of the present disclosure provides a traffic sign recognizing apparatus that may recognize traffic sign information including speed limit information and conditional information, may reflect driving route information of a host vehicle, and may determine whether to output the recognized traffic sign information, and a method thereof.

The technical problems to be solved by the present disclosure are not limited to the aforementioned problems, and any other technical problems not mentioned herein will be clearly understood from the following description by those skilled in the art to which the present disclosure pertains.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a traffic sign recognizing apparatus includes: a camera sensor configured to capture an image in front of a vehicle; a recognition device configured to: recognize a speed limit sign from the captured image; and obtain from the captured image, traffic sign information including at least one of speed limit information, conditional information, or a combination thereof; a display device; and a control device configured to: determine output information by combining the speed limit information and the conditional information included in each of one or more pieces of the traffic sign information when the one or more pieces of the traffic sign information related to the speed limit sign are obtained by the recognition device, and the one or more pieces of the traffic sign information satisfy a predetermined condition; and control the display device to display the output information.

The control device may be further configured to determine whether to output the output information to the display device, based on driving route information of the vehicle and the conditional information.

The control device may be further configured to allow the output information to be displayed on the display device, when the conditional information is included in the driving route information.

The control device may be further configured to determine the output information by combining the speed limit information and the conditional information, when one or more pieces of the speed limit information included in the one or more pieces of the traffic sign information are the same as each other, one or more pieces of lateral distance information included in the one or more pieces of the traffic sign information are similar to each other within a specific range, and one or more pieces of height information included in the one or more pieces of the traffic sign information are similar to each other within a specific range.

The control device may be further configured to determine the output information by combining the speed limit information and the conditional information at a specific time when the vehicle acquires both first longitudinal distance information and second longitudinal distance information when the one or more pieces of the traffic sign information include first traffic sign information, which includes the first longitudinal distance information, and second traffic sign information which includes the second longitudinal distance information.

The conditional information may include information derived from at least one of a speed limit sign based on a time zone, a speed limit sign based on vehicle type, a speed limit sign based on vehicle weight, a speed limit sign based on a weather condition, or any combination thereof.

The control device may be further configured to determine whether the vehicle will exit from a main road to a branch road, and when it is determined that the vehicle will not exit the main road, ignore the speed limit sign related to the branch road.

In another general aspect of the disclosure, a traffic sign recognizing method includes: recognizing a speed limit sign from an image captured in front of a vehicle; obtaining from the captured image, traffic sign information including at least one of speed limit information, conditional information, or a combination thereof; determining whether on or more pieces of the traffic sign information satisfy a predetermined condition when the one or more pieces of the traffic sign information related to the speed limit sign are obtained; determining output information by combining the speed limit information and the conditional information included in each of the one or more pieces of the traffic sign information when the predetermined condition is satisfied; and displaying the output information.

The determining of the output information may include determining whether to output the output information, based on driving route information of the vehicle and the conditional information.

The determining of whether to output the output information may include allowing the output information to be displayed, when the conditional information is included in the driving route information.

The determining of the output information may include determining the output information by combining the speed limit information and the conditional information, when one or more pieces of the speed limit information included in the one or more pieces of the traffic sign information are the same as each other, one or more pieces of lateral distance information included in the one or more pieces of the traffic sign information are similar to each other within a specific range, and one or more pieces of height information included in the one or more pieces of the traffic sign information are similar to each other within a specific range.

The determining of the output information may include determining the output information by combining the speed limit information and the conditional information at a specific time when the vehicle acquires both first longitudinal distance information and second longitudinal distance information when the one or more pieces of the traffic sign information include first traffic sign information, which includes the first longitudinal distance information, and second traffic sign information which includes the second longitudinal distance information.

The features briefly summarized above with respect to the present disclosure are merely aspects of the detailed description of the present disclosure described below, and do not limit the scope of the present disclosure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
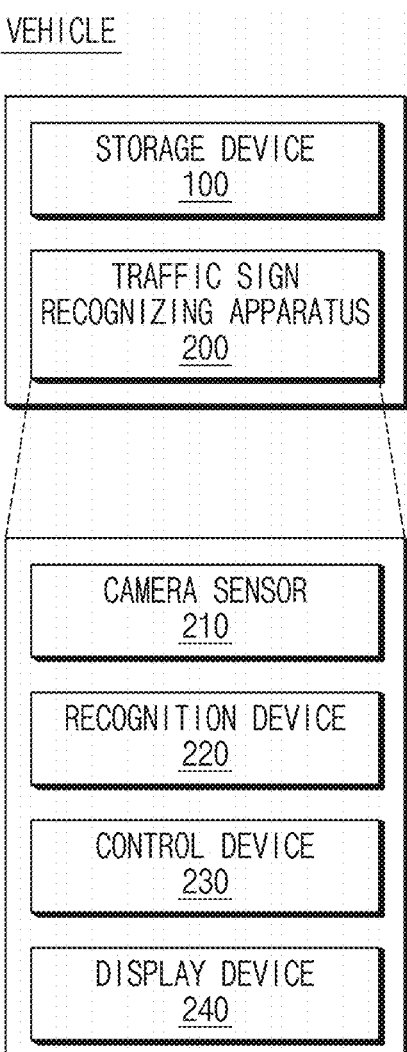
FIG. 1 shows a block diagram of a traffic sign recognizing apparatus, according to an embodiment of the present disclosure.

Hereinafter, various embodiments of the present disclosure will be described in detail with reference to the accompanying drawings, so that those skilled in the art may easily carry out the present disclosure. However, the present disclosure is not limited to the embodiments set forth herein and may be modified variously in many different forms.

In describing the embodiments of the present disclosure, when a specific description of the related art is deemed to obscure the subject matter of the embodiments of the present disclosure, the detailed description will be omitted. In addition, in the drawings, parts that are not related to the description of the present disclosure are omitted, and similar parts are given similar reference numerals.

In the present disclosure, it will be understood that when an element is referred to as being "connected" or "coupled" to another element, it may be directly connected or indirectly connected to another element. In addition, when some part 'includes' or "possess" some elements, unless explicitly described to the contrary, it means that other elements may be further included but not excluded.

In the present disclosure, expressions such as "first," or "second," and the like, may express their elements regardless of their priority or importance and may be used to distinguish one element from another element but is not limited to these components. Therefore, without departing from the scope of the present disclosure, a first component of one embodiment may be referred to as a second component of another embodiment. Similarly, a second component of one embodiment may be referred to as a first component of another embodiment.

In the present disclosure, components that are distinguished from each other are only for clearly describing characteristics, and do not mean that the components are necessarily separated. That is, a plurality of components may be integrated to form a single hardware or software unit, or a single component may be distributed to form a plurality of hardware or software units. Accordingly, such integrated or distributed embodiments are included in the scope of the present disclosure, even though not mentioned separately.

In the present disclosure, components described in various embodiments do not necessarily mean essential components, and some may be optional components. Therefore, an embodiment composed of a subset of components described in an embodiment is also included in the scope of the present disclosure. In addition, embodiments including other components in addition to the components described in various embodiments are also included in the scope of the present disclosure.

In the present disclosure, expressions of positional relationships used herein, such as upper, lower, left, right, and the like are described for convenience of description. When viewing the drawings shown in this specification in reverse, the positional relationship described in the specification may be interpreted in the opposite manner.

As used herein, each of such phrases as "A or B," "at least one of A and B," "at least one of A or B," "A, B, or C," "at least one of A, B, or C, or any combination thereof," and "at least one of A, B, or C," may include any one of, or all possible combinations of the items enumerated together in a corresponding one of the phrases.

Embodiments of the present disclosure are intended to prevent a speed limit sign including a conditional traffic sign and a main traffic sign from being incorrectly recognized. When pieces of traffic sign information are obtained because the speed limit sign is incorrectly recognized, accurate traffic sign information may be provided to a driver even when the speed limit sign is incorrectly recognized, by combining pieces of information included in each of the piece of traffic sign information under a predetermined specific condition to determine final traffic sign information to be output.

According to an embodiment of the present disclosure, only final traffic sign information included in the driving route may be output without outputting final traffic sign information not included in the driving route by determining whether to output the final traffic sign information based on the driving route of a host vehicle.

According to an embodiment of the present disclosure, when a predetermined specific condition for the pieces of traffic sign information is satisfied, accurate traffic sign information including conditional information and speed limit information may be provided by combining the conditional information about a conditional traffic sign and the speed limit information about a main traffic sign.

The apparatus and method of this disclosure will be described with reference to FIGS. 1 to 5.

FIG. 1 shows a block diagram of a traffic sign recognizing apparatus according to an embodiment of the present disclosure, and shows a block diagram of a traffic sign recognizing apparatus mounted on a host vehicle.

As shown in FIG. 1, a vehicle includes a storage device 100 and a traffic sign recognizing apparatus 200.

Although not shown in FIG. 1, the vehicle may include an advanced driver assistance system (ADAS), a navigation device, a radar sensor, or the like.

The storage device 100 refers to a means for storing data related to the technology of the present disclosure and vehicle-related data. This part is obvious to those skilled in the art of the present disclosure, and thus detailed descriptions thereof will be omitted to avoid redundancy.

The traffic sign recognizing apparatus 200 may include a camera sensor 210 (e.g., a camera), a recognition device 220 (e.g., a recognizer), a control device 230 (e.g., a controller), and a display device 240 (e.g., a display). According to an embodiment, the traffic sign identification apparatus 200 may include a vehicle control unit (VCU).

The camera sensor 210 captures the front of the vehicle in real time and provides an image of a traffic sign to the recognition device 220.

According to an embodiment, the camera sensor 210 may capture, in real time, a traffic sign including only a main traffic sign for a speed limit, a traffic sign (e.g., a speed limit sign) including a main traffic sign and a conditional traffic sign including conditional information, or the like and may provide the captured image to the recognition device 220.

The recognition device 220 recognizes a traffic sign, preferably, a speed limit sign, from the image received from the camera sensor 210, obtains traffic sign information including at least one of speed limit information or conditional information, and provides the control device 230 with the traffic sign information thus obtained.

According to an embodiment, the recognition device 220 may include TSR logic. When incorrectly recognizing a traffic sign, the recognition device 220 may obtain pieces of traffic sign information such as first traffic sign information including only speed limit information, and second traffic sign information including speed limit information and conditional information from a speed limit sign including a conditional traffic sign and a main traffic sign (speed limit).

The traffic sign information output from the TSR logic of the recognition device 220 may include at least one of speed limit information or conditional information, lateral distance information from the camera sensor 210 to the speed limit sign, longitudinal distance information, and height information.

Here, when recognizing one speed limit sign as a first speed limit sign including only a main traffic sign, and a second speed limit sign including the main traffic sign and a conditional traffic sign, the recognition device 220 may obtain, from the first speed limit sign, first traffic sign information including speed limit information, lateral distance information to the first speed limit sign, longitudinal distance information, and height information, and may obtain, from the second speed limit sign, second traffic sign information including speed limit information, conditional information, lateral distance information to the second speed limit sign, longitudinal distance information, and height information.

Figure 2A:
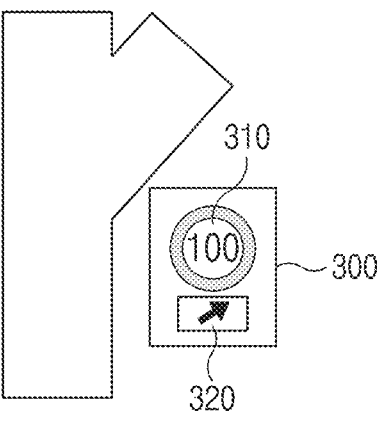
FIGS. 2A and 2B show example diagrams for describing a case where a speed limit sign is incorrectly recognized.
Figure 2B:
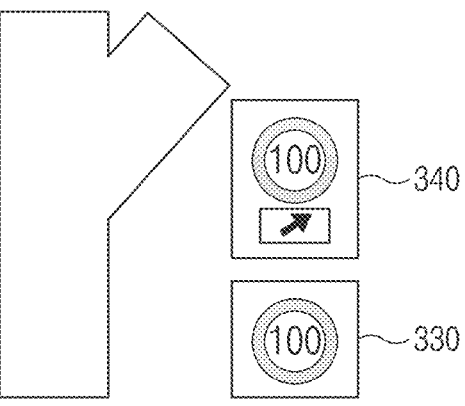

For example, as shown in FIG. 2A, the recognition device 220 may recognize an actual speed limit sign 300 including a main traffic sign 310 and a conditional traffic sign 320. As shown in FIG. 2B, the recognition device 220 may recognize the actual speed limit sign 300 as a first speed limit sign 330, which has a first longitudinal distance and includes only the main traffic sign, and a second speed limit sign 340, which has a second longitudinal distance farther than the first longitudinal distance and includes the main traffic sign and a conditional traffic sign. The recognition device 220 may obtain first traffic sign information (including first longitudinal distance information, lateral distance information, height information, and speed limit information) about the first speed limit sign 330 and second traffic sign information (including second longitudinal distance information, lateral distance information, height information, speed limit information, and conditional information) about the second speed limit sign 340, and may provide information about this to the control device 230. In this case, the first traffic sign information may include speed limit information of 100, lateral distance information of 10 m, longitudinal distance information of 5 m, and height information of 2 m. The second traffic sign information may include speed limit information of 100, conditional information about a branch road, lateral distance information of 10 m, longitudinal distance information of 10 m, and height information of 2 m.

As shown in FIGS. 2A and 2B, the TSR logic of the recognition device 220 may incorrectly recognize the one speed limit sign 300 including a conditional traffic sign as a plurality of speed limit signs 330 and 340. The apparatus according to an embodiment of the present disclosure may prevent an erroneous output of a speed limit, which is capable of occurring by incorrectly being recognized.

Figure 3A:
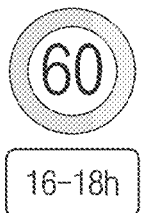
FIGS. 3A to 3D show example diagrams of a speed limit sign including a conditional traffic sign.
Figure 3B:
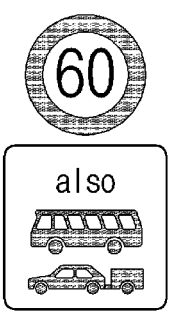
Figure 3C:
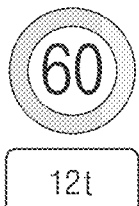
Figure 3D:
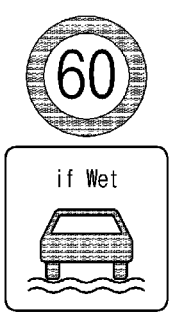

The speed limit sign 300 shown in FIG. 2A is used for a speed limit sign including the conditional traffic sign 320 for a branch road. In the detailed description of the present disclosure, the conditional traffic sign is not limited to a conditional traffic sign for a branch road. An embodiment of the present disclosure may be applied to various conditional traffic signs. For example, the apparatus according to an embodiment of the present disclosure may be applied to a speed limit sign including a conditional traffic sign for a time zone as shown in FIG. 3A, a speed limit sign including a conditional traffic sign for the corresponding vehicles as shown in FIG. 3B, a speed limit sign including a conditional traffic sign for a weight as shown in FIG. 3C, a speed limit sign including a conditional traffic sign for rain as shown in FIG. 3D, or the like.

When pieces of traffic sign information about a speed limit sign are obtained by the recognition device 220, and the pieces of traffic sign information satisfy a predetermined condition, the control device 230 determines output information by combining speed limit information and conditional information included in each of the piece of traffic sign information.

Here, the predetermined condition may mean a case that, among information included in first traffic sign information and second traffic sign information, pieces of speed limit information are the same as each other, pieces of lateral distance information and are similar to each other within a specific range, and pieces of height information are similar to each other within a specific range. The specific range may mean a difference between the pieces of lateral distance information included in the piece of traffic sign information, and a difference between the pieces of height information included in the piece of traffic sign information. When the pieces of speed limit information are the same as each other, and a difference value of lateral distance information and a difference value of height information are smaller than a predetermined standard difference value, the control device may determine that first traffic sign information and second traffic sign information are traffic sign information about one speed limit sign.

In other words, because only longitudinal distance information is different and lateral distance information and height information are almost similar when the first traffic sign information and the second traffic sign information are obtained from one speed limit sign, the control device 230 determines pieces of traffic sign information as information about one traffic sign based on the speed limit information, the lateral distance information, and the height information.

For example, it is assumed that the first traffic sign information includes speed limit information of 100, lateral distance information of 10 m, longitudinal distance information of 5 m, and height information of 2 m, and the second traffic sign information includes speed limit information of 100, conditional information about a branch road, lateral distance information of 10 m, longitudinal distance information of 10 m, and height information of 2 m. In this case, because the pieces of speed limit information match each other as 100, the pieces of lateral distance information match each other as 10 m, and the pieces of height information match each other 2 m, the control device 230 may determine that first traffic sign information and second traffic sign information are obtained from one speed limit sign.

Accordingly, the control device 230 may combine the speed limit information of 100 and the conditional information about a branch road and then may determine output information of branch road speed limit of 100.

According to an embodiment, the control device 230 may determine whether to output the output information (e.g., output information of branch road speed limit of 100) determined by combining pieces of traffic sign information to the display device 240, based on driving route information of the host vehicle. For example, when conditional information included in the output information is included in the driving route information of the host vehicle, the control device 230 may allow the output information to be displayed to a driver. When the conditional information included in output information is not included in the driving route information of the host vehicle, the control device 230 may allow the output information not to be displayed to the driver.

Figure 4A:
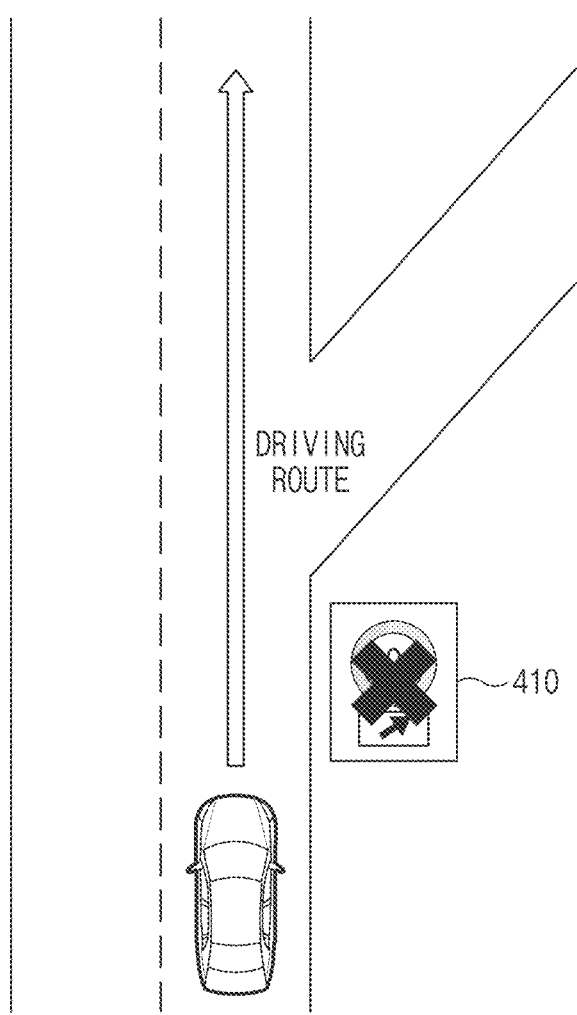
FIGS. 4A and 4B show example diagrams for describing whether speed limit sign information is output based on a driving route.

For example, as shown in FIG. 4A, because output information 410 of a branch road speed limit of 100 thus finally combined is speed limit sign information for a branch road, and the host vehicle is not driving on a branch road but is driving in a straight direction, the control device 230 controls the output information 410 of the branch road speed limit of 100 not to be output through the display device 240.

Figure 4B:
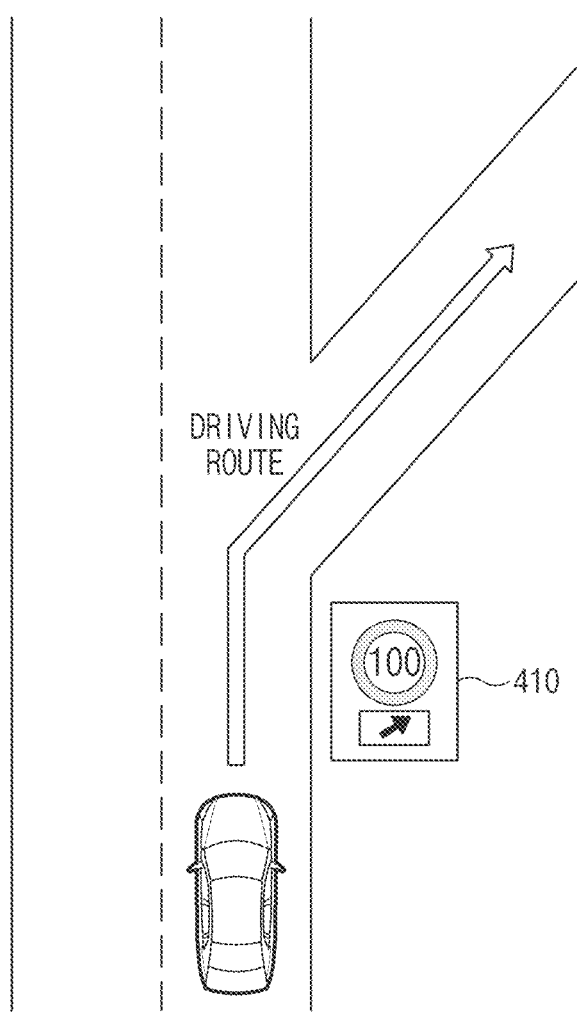

For another example, as shown in FIG. 4B, because output information 410 of a branch road speed limit of 100 thus finally combined is speed limit sign information for a branch road, and the host vehicle is driving on a branch road, the control device 230 controls the output information 410 of the branch road speed limit of 100 to be output through the display device 240.

According to an embodiment, the control device 230 may determine the timing of determining output information or the timing of providing output information to the display device 240. For example, when the pieces of traffic sign information include first traffic sign information including first longitudinal distance information and second traffic sign information including second longitudinal distance information, the control device 230 may determine the output information by combining the speed limit information and the conditional information at a specific point in time when the host vehicle passes both the first longitudinal distance information and the second longitudinal distance information. In other words, the control device 230 may determine output information or may hold the output until the host vehicle passes a plurality of speed limit signs recognized by the recognition device 220, and may determine output information by combining pieces of traffic sign information after passing a plurality of speed limit signs, thereby preventing a speed limit sign including a conditional traffic sign from being incorrectly recognized.

The display device 240 displays output information (e.g., output information of a branch road speed limit of 100) under control of the control device 230.

As such, a traffic sign recognizing apparatus according to an embodiment of the present disclosure may prevent erroneous output of speed limit information caused by omitting a conditional traffic sign from a speed limit sign including a traffic sign (e.g., a conditional traffic sign).

Moreover, the traffic sign recognizing apparatus according to an embodiment of the present disclosure may recognize traffic sign information including speed limit information and conditional information, may reflect driving route information of a host vehicle, and may determine whether to output the recognized traffic sign information, thereby preventing unnecessary traffic sign information from being output and helping a driver drive safely.

Furthermore, the traffic sign recognizing apparatus according to an embodiment of the present disclosure may prevent speed limit information from being output incorrectly, and may improve the output accuracy for speed limit information by outputting traffic sign information combined at a point in time when all longitudinal distances pass, when pieces of traffic sign information, in which longitudinal distances are different from each other, are recognized in a speed limit sign including a conditional traffic sign.

Figure 5:
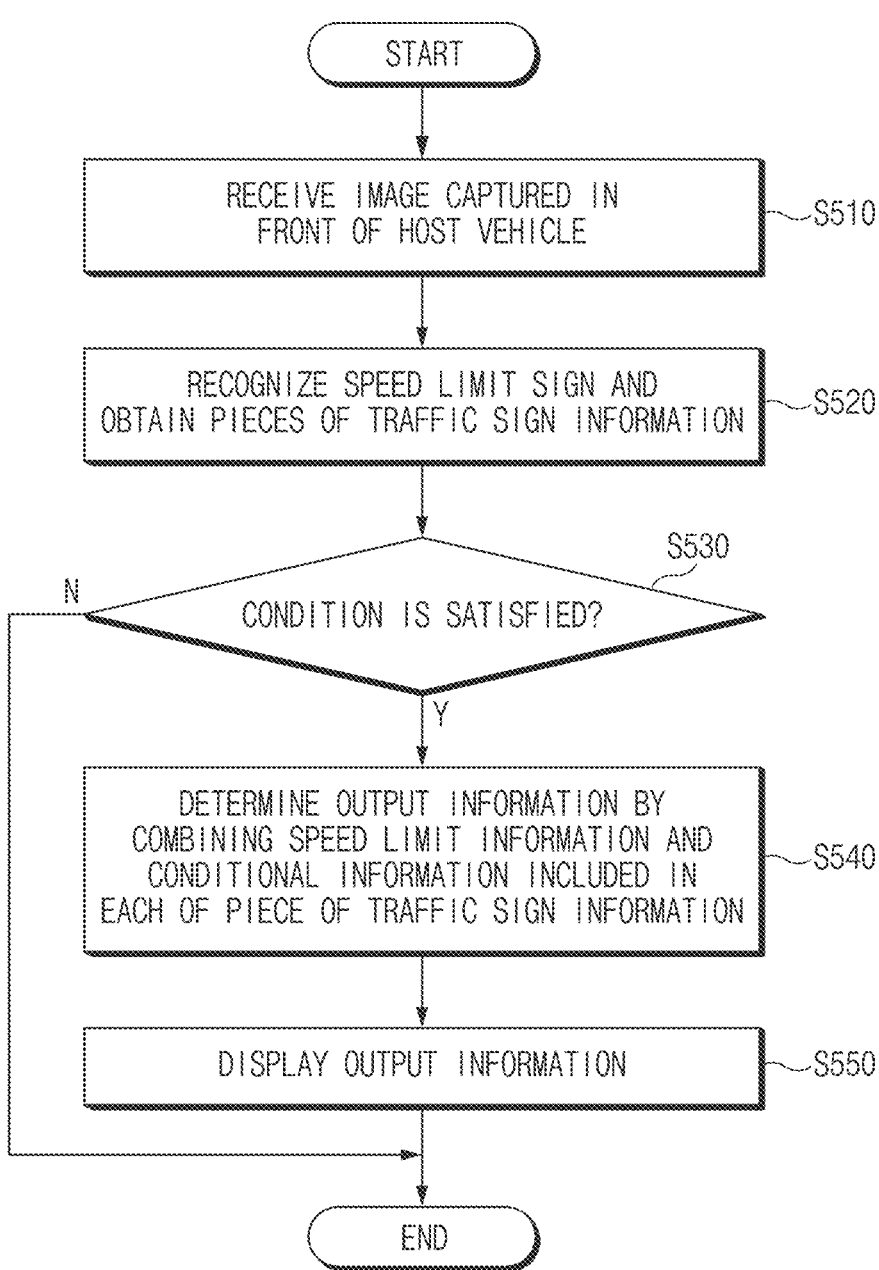
FIG. 5 shows an operation flowchart for a traffic sign recognizing method, according to anther embodiment of the present disclosure.

FIG. 5 shows an operation flowchart for a traffic sign recognizing method, according to anther embodiment of the present disclosure, and shows a flowchart of operations in the traffic sign recognition apparatus shown in FIG. 1.

Referring to FIG. 5, a traffic sign recognition method according to another embodiment of the present disclosure receives an image captured in front of a host vehicle by a camera sensor in real time (S510), and recognizes a speed limit sign included in the received image (e.g., a speed limit sign including a conditional traffic sign), and obtains pieces of traffic sign information about the speed limit sign (S520).

According to an embodiment, S520 includes obtaining traffic sign information about various speed limit signs, such as a speed limit sign including only the main traffic sign and a speed limit sign including the main traffic sign and the conditional traffic sign due to incorrect recognition caused by a conditional traffic sign as traffic sign information output by TSR logic for recognizing a speed limit sign. Here, the traffic sign information may include at least one of speed limit information or conditional information, lateral distance information from a camera sensor to the speed limit sign, longitudinal distance information, and height information.

The traffic sign recognition method includes determining whether the pieces of traffic sign information satisfy a predetermined condition, when pieces of traffic sign information are obtained in S520, and determining output information by combining speed limit information and conditional information included in each of the piece of traffic sign information, when the predetermined condition is satisfied.

Here, the predetermined condition may mean a case that, among pieces of traffic sign information (e.g., information included in first traffic sign information and second traffic sign information), pieces of speed limit information are the same as each other, pieces of lateral distance information and are similar to each other within a specific range, and pieces of height information are similar to each other within a specific range.

In other words, S540 includes determining pieces of traffic sign information as information about one traffic sign based on the speed limit information, the lateral distance information, and the height information because only longitudinal distance information is different and lateral distance information and height information are almost similar when the first traffic sign information and the second traffic sign information are obtained from one speed limit sign, and determining output information as traffic sign information for one speed limit sign by combining speed limit information and conditional information included in each of the piece of traffic sign information.

According to an embodiment, S540 includes determining output information or holding the output until the host vehicle passes a plurality of speed limit signs thus recognized, and determining output information by combining pieces of traffic sign information at a point in time when a host vehicle passes a plurality of speed limit signs.

The traffic sign recognition method includes displaying the determined output information to a driver when the output information is determined in S540 (S550).

According to an embodiment, in S550, whether to output the output information may be determined based on the driving route information of the host vehicle. When conditional information included in the output information is included in the driving route information of the host vehicle, the output information is displayed to the driver. When the conditional information is not included in the driving route information of the host vehicle, the output information is not displayed to the driver.

Even though the description is omitted in the method according to another embodiment of the present disclosure, it will be apparent to those skilled in the art that the method according to another embodiment of the present disclosure may include all of the contents described in the apparatus of FIGS. 1 to 4B, and this will be obvious to those skilled in the art.

Figure 6:
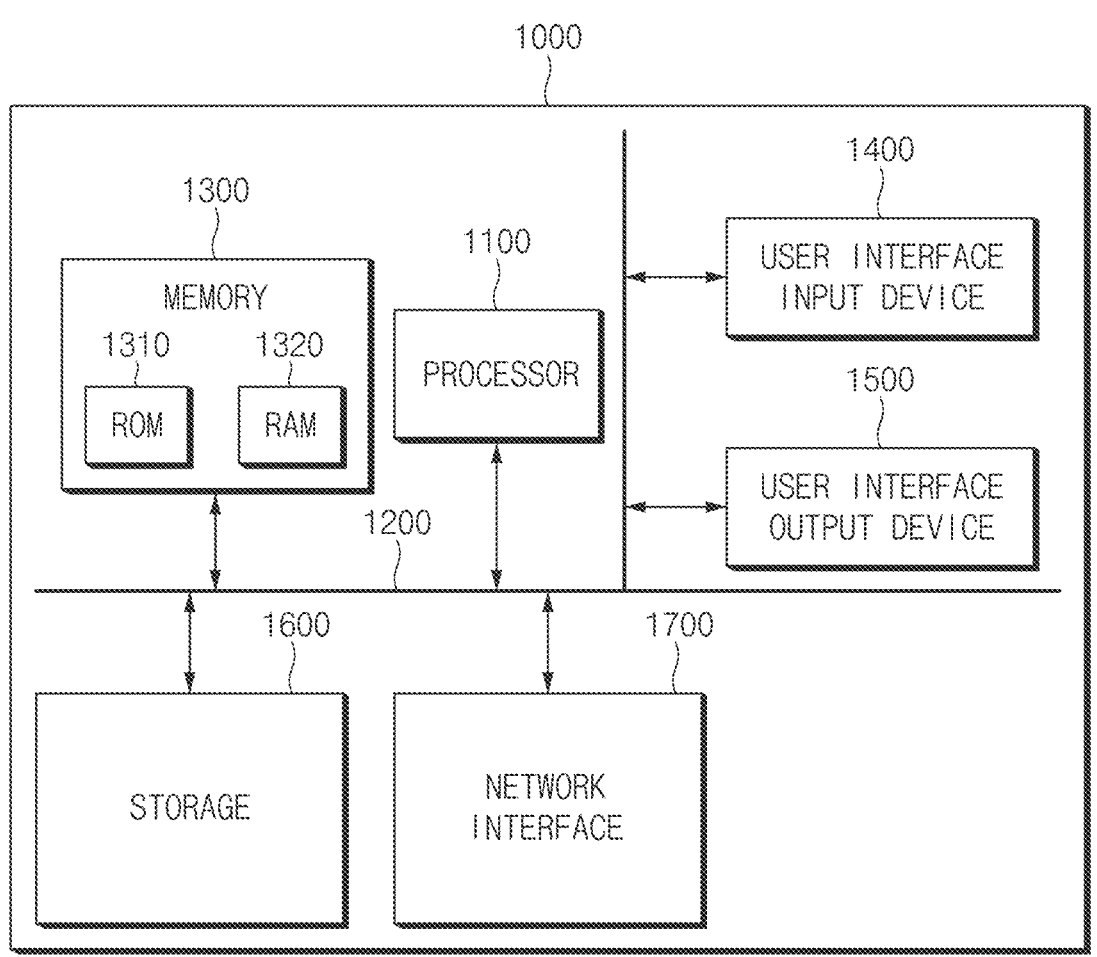
FIG. 6 shows a block diagram of a computing system for executing a traffic sign recognizing method, according to another embodiment of the present disclosure.

FIG. 6 shows a block diagram of a computing system for executing a traffic sign recognizing method, according to another embodiment of the present disclosure.

Referring to FIG. 6, the above-described traffic sign recognizing method according to another embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor 1100 and storage medium may be implemented with an application specific integrated circuit (ASIC). The ASIC may be provided in a user terminal. Alternatively, the processor 1100 and storage medium may be implemented with separate components in the user terminal.

The above description is merely an example of the technical idea of the present disclosure, and various modifications and modifications may be made by one skilled in the art without departing from the essential characteristic of the present disclosure. Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, an apparatus may prevent erroneous output of speed limit information caused by omitting a conditional traffic sign from a speed limit sign including a traffic sign (e.g., a conditional traffic sign).

According to an embodiment of the present disclosure, an apparatus may recognize traffic sign information including speed limit information and conditional information, may reflect driving route information of a host vehicle, and may determine whether to output the recognized traffic sign information, thereby preventing unnecessary traffic sign information from being output and helping a driver drive safely.

According to an embodiment of the present disclosure, when pieces of traffic sign information, in which longitudinal distances are different from each other, are recognized in a speed limit sign including a conditional traffic sign, speed limit information may be prevented from being output incorrectly, and the output accuracy for speed limit information may be improved by outputting traffic sign information combined at a point in time when all longitudinal distances pass.

Effects obtained in the present disclosure are not limited to the above-mentioned effects, and other effects that are not mentioned will be clearly understood by those skilled in the art, to which the present disclosure belongs, from the following description.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A traffic sign recognizing apparatus comprising:
a camera sensor configured to capture an image in front of a vehicle;
a recognizer configured to:
recognize a speed limit sign from the captured image; and
obtain from the captured image, traffic sign information including at least one of speed limit information, conditional information, or a combination thereof;
a display device; and
a controller configured to:
determine output information by combining the speed limit information and the conditional information included in each of one or more pieces of the traffic sign information when the one or more pieces of the traffic sign information related to the speed limit sign are obtained by the recognizer, and the one or more pieces of the traffic sign information satisfy a predetermined condition;
control the display device to display the output information; and
determine the output information by combining the speed limit information and the conditional information, when one or more pieces of the speed limit information included in the one or more pieces of the traffic sign information are the same as each other, one or more pieces of lateral distance information included in the one or more pieces of the traffic sign information are similar to each other within a specific range, and one or more pieces of height information included in the one or more pieces of the traffic sign information are similar to each other within a specific range.

2. The traffic sign recognizing apparatus of claim 1, wherein the controller is further configured to:
determine whether to output the output information to the display device, based on driving route information of the vehicle and the conditional information.

3. The traffic sign recognizing apparatus of claim 2, wherein the controller is further configured to:

allow the output information to be displayed on the display device, when the conditional information is included in the driving route information.

4. The traffic sign recognizing apparatus of claim 1, wherein the controller is further configured to:
determine the output information by combining the speed limit information and the conditional information at a specific time when the vehicle acquires both first longitudinal distance information and second longitudinal distance information when the one or more pieces of the traffic sign information include first traffic sign information, which includes the first longitudinal distance information, and second traffic sign information which includes the second longitudinal distance information.

5. The traffic sign recognizing apparatus of claim 1, wherein the conditional information includes information derived from at least one of a speed limit sign based on a time zone, a speed limit sign based on vehicle type, a speed limit sign based on vehicle weight, a speed limit sign based on a weather condition, or any combination thereof.

6. The traffic sign recognizing apparatus of claim 1, wherein the controller is further configured to:
determine whether the vehicle will exit from a main road to a branch road; and
when it is determined that the vehicle will not exit the main road, ignore the speed limit sign related to the branch road.

7. A traffic sign recognizing method, the method comprising:
recognizing a speed limit sign from an image captured image in front of a vehicle;
obtaining from the captured image, traffic sign information including at least one of speed limit information, conditional information, or a combination thereof;
determining whether on or more pieces of the traffic sign information satisfy a predetermined condition when the one or more pieces of the traffic sign information related to the speed limit sign are obtained;
determining output information by combining the speed limit information and the conditional information included in each of the one or more pieces of the traffic sign information when the predetermined condition is satisfied; and
displaying the output information,
wherein the determining of the output information includes:
determining the output information by combining the speed limit information and the conditional information, when one or more pieces of the speed limit information included in the one or more pieces of the traffic sign information are the same as each other, one or more pieces of lateral distance information included in the one or more pieces of the traffic sign information are similar to each other within a specific range, and one or more pieces of height information included in the one or more pieces of the traffic sign information are similar to each other within a specific range.

8. The method of claim 7, wherein the determining of the output information includes:
determining whether to output the output information, based on driving route information of the vehicle and the conditional information.

9. The method of claim 8, wherein the determining of whether to output the output information includes:

allowing the output information to be displayed, when the conditional information is included in the driving route information.

10. The method of claim 7, wherein the determining of the output information includes:

determining the output information by combining the speed limit information and the conditional information at a specific time when the vehicle acquires both first longitudinal distance information and second longitudinal distance information when the one or more pieces of the traffic sign information include first traffic sign information, which includes the first longitudinal distance information, and second traffic sign information which includes the second longitudinal distance information.

11. The method of claim 7, wherein the conditional information includes information derived from at least one of a speed limit sign based on a time zone, a speed limit sign based on vehicle type, a speed limit sign based on vehicle weight, a speed limit sign based on a weather condition, or any combination thereof.

12. The method of claim 7, further comprising:

determining whether the vehicle will exit from a main road to a branch road; and when it is determined that the vehicle will not exit the main road, ignoring the speed limit sign related to the branch road.

\* \* \* \* \*